United States Patent
Paulraj et al.

(10) Patent No.: US 12,361,133 B2
(45) Date of Patent: Jul. 15, 2025

(54) SYSTEM-LEVEL SERVICE DISCOVERY IN A MULTI-BASEBOARD MANAGEMENT CONTROLLER (BMC) ENVIRONMENT

(71) Applicant: Dell Products, L.P., Round Rock, TX (US)

(72) Inventors: Deepaganesh Paulraj, Bangalore (IN); Mini Thottunkal Thankappan, Bangalore (IN); Rama Rao Bisa, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 182 days.

(21) Appl. No.: 18/183,687

(22) Filed: Mar. 14, 2023

(65) Prior Publication Data
US 2024/0311482 A1    Sep. 19, 2024

(51) Int. Cl.
*G06F 21/00* (2013.01)
*G06F 21/44* (2013.01)
*G06F 21/57* (2013.01)

(52) U.S. Cl.
CPC .............. *G06F 21/57* (2013.01); *G06F 21/44* (2013.01); *G06F 2221/034* (2013.01)

(58) Field of Classification Search
CPC .... G06F 21/57; G06F 21/44; G06F 2221/034; G06F 21/85
See application file for complete search history.

(56) References Cited

U.S. PATENT DOCUMENTS

| | | | |
|---|---|---|---|
| 10,242,176 B1* | 3/2019 | Sathyanarayana | G06F 13/36 |
| 11,354,259 B1* | 6/2022 | Hilland | G06F 9/4406 |
| 2022/0124118 A1* | 4/2022 | Bangalore Sathyanarayana | H04L 63/1416 |
| 2022/0179961 A1* | 6/2022 | Yao | G06F 13/4221 |
| 2022/0188465 A1* | 6/2022 | Straw | G06F 21/44 |
| 2023/0269126 A1* | 8/2023 | Parthasarathy | G06F 9/5027 709/223 |
| 2024/0291786 A1* | 8/2024 | Jurski | H04L 51/21 |

OTHER PUBLICATIONS

Alves, Renan CA, Bruno C. Albertini, and Marcos A. Simplicio. "Securing hard drives with the security protocol and data model (SPDM)." 2022 IEEE Computer Society Annual Symposium on VLSI (ISVLSI). IEEE, 2022. (Year: 2022).*

* cited by examiner

*Primary Examiner* — Ka Shan Choy
(74) *Attorney, Agent, or Firm* — Fogarty LLP

(57) ABSTRACT

Systems and methods provide one or more host processor modules configured to host SPDM-enabled hardware devices, and a secure control module configured to host two or more baseboard management controllers. Each of the baseboard management controllers are configured to discover the SPDM-enabled hardware devices using SPDM messages, negotiate with at least one other baseboard management controller for access to individual ones of the SPDM-enabled hardware devices, and manage selected ones of the SPDM-enabled hardware devices.

20 Claims, 4 Drawing Sheets

SYSTEM-LEVEL SERVICE DISCOVERY IN A MULTI-BASEBOARD MANAGEMENT CONTROLLER (BMC) ENVIRONMENT

BACKGROUND

The Open Compute Project's (OCP) Datacenter-Modular Hardware System (DC-MHS) sub-project is directed to interoperability between elements of datacenter, edge, and enterprise infrastructure. DC-MHS provides consistent interfaces and form factors among modular building blocks. DC-MHS standardizes a collection of form-factors and supporting ingredients to allow interoperability between different platforms. The Security Protocol and Data Model (SPDM) specification defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Datacenter, edge, and enterprise infrastructure may include various Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments are directed to a multiple Baseboard Management Controller (BMC) system in which the BMCs establish SPDM secure sessions with hardware devices based on the topology and bandwidth of the internal hardware channels to facilitate workload sharing. The BMCs share SPDM secure session details to allow another BMC to seamlessly take over a connection with hardware devices in the event of a failure.

In one embodiment, an IHS comprises one or more host processor modules configured to host SPDM-enabled hardware devices, and a secure control module configured to host two or more baseboard management controllers. Each of the baseboard management controllers are configured to discover the SPDM-enabled hardware devices using SPDM messages, negotiate with at least one other baseboard management controller for access to individual ones of the SPDM-enabled hardware devices, and manage selected ones of the SPDM-enabled hardware devices.

The baseboard management controller identifies a communication bandwidth associated with each of the SPDM-enabled hardware devices and determines which of the SPDM-enabled hardware devices can be managed by the baseboard management controller based upon the communication bandwidth associated with the SPDM-enabled hardware devices.

The baseboard management controller identifies a communication protocol associated with each of the SPDM-enabled hardware devices and determines which of the SPDM-enabled hardware devices can be managed by the baseboard management controller based upon the communication protocol associated with the SPDM-enabled hardware devices. The communication protocol includes one or more of an Inter-Integrated Circuit (I2C) transport protocol, an I3C protocol, and a Peripheral Component Interconnect Express Vendor-Defined Message (PCIe-VDM) protocol.

The baseboard management controller establishes secure communication sessions with the selected ones of the SPDM-enabled hardware devices. The baseboard management controller provides credentials for the secure communication sessions with at least one other baseboard management controller.

The baseboard management controller receives communication credentials from another baseboard management controller, wherein the credentials are associated with secure communication sessions between the other baseboard management controller and additional ones of the SPDM-enabled hardware devices. When the baseboard management controller receives notification that the other baseboard management controller is not communicating with the additional ones of the SPDM-enabled hardware devices, then it uses the communication credentials to establish secure communication sessions with the additional ones of the SPDM-enabled hardware devices.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Modular server architectures give cloud service providers a variety of compute choices to meet market and business conditions, offer flexible configurations, and deliver innovative solutions. The Datacenter-Modular Hardware System (DC-MHS) provides interoperability between datacenter, edge, and enterprise infrastructure using consistent interfaces and modular building blocks. DC-MHS standardizes various Host Processor Module (HPM) form factors and provides supporting elements for interoperability of HPMs across various platforms. The HPM is managed by a Datacenter-Secure Control Module (DC-SCM), which is designed to enable a common management and security infrastructure across platforms within a data center. The interface between the DC-SCM and the HPM is referred as the Datacenter-Secure Control Interface (DC-SCI).

The HPM is a traditional CPU-memory device with the Baseboard Management Controllers (BMC) and security functions moved to the DC-SCM. HPMs are not limited to a standard processor architecture and can apply any processor architecture utilizing management and security features.

Figure 1:
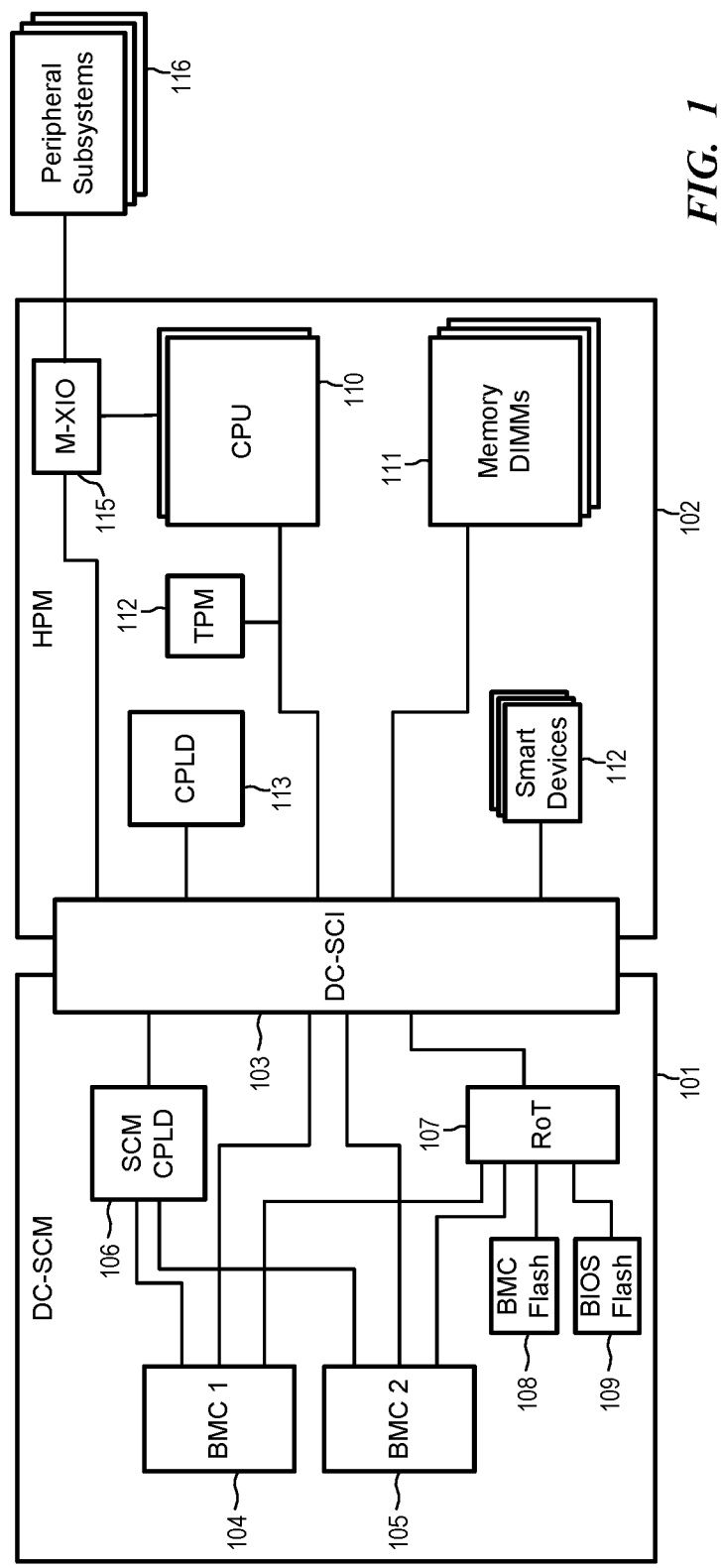
FIG. 1 is a block diagram illustrating multi-node building blocks of a Datacenter-Modular Hardware System.

FIG. 1 is a block diagram illustrating multi-node building blocks of a DC-MHS. DC-SCM 101 is coupled to HPM 102 via DC-SCI 103. The DC-SCM 101 consists of multiple BMCs 104, 105 which are specialized service processors that manages and monitors the DC-SCM 101. As a non-limiting example of a BMC 104, 105, the integrated Dell Remote Access Controller (iDRAC) from DELL, INC. is embedded within DELL® PowerEdge servers and provides functionality that helps information technology (IT) administrators at a remote operations centers deploy, update, monitor, and maintain servers with no need for any additional software to be installed.

A complex programmable logic device (DC-SCM CPLD) 106 contains application specific logic and a high-speed and scalable Low-voltage differential signaling Tunneling Protocol & Interface (LTPI). A Roots of Trust (RoT) Security Processor 107 is responsible for attesting the BMC, BIOS, and/or other firmware images on the system. BMC Flash 108 consists of one or more flash devices used to contain the BMC firmware image. BIOS Flash 109 consist of one or more flash devices used to contain the BIOS firmware image for each node.

HPM 102 represents a general form factor that allows for maximum input/output (I/O) of CPUs 110 in the accessible slots. HPM 102 also includes memory or Dual In-line Memory Modules (DIMMs) 111. The HPM 102 form factor does not require a specific CPU 110 or memory 111 technology. Various HPM 102 form factors support different numbers of CPUs 110 and memory slots 111. The HPM specifications are adapted to allow multiple generations of compute core designs to fit into the form factor specification so that chassis and system designs can be reused as desired.

Trusted Platform Modules (TPM) 112 provide hardware-based, security-related functions for CPUs 110 through integrated cryptographic keys. CPLD 113 supports data exchange between DC-SCM CPLD 106 and HPM 102 using LPTI. In other configurations, HPM 102 may include other hardware components (not shown), such as memory devices, graphics processing units (GPU), peripheral I/O, etc.

HPM 102 may also include one or more smart devices 114, such as a Smart Network Interface Card (NIC), which is a programable device used to improve data center networking performance, security, features, and flexibility. Other smart devices 114 may include, for example, data processing units (DPU) and infrastructure processing units (IPU).

In the DC-MHS environment an Extensible I/O (M-XIO) source connector 115 enables connectivity to peripheral subsystems 116. M-XIO 115 is a universal hardware API intended to enable the connectivity requirements of multiple different peripheral modules 116 without requiring a connector hardware. M-XIO 115 connector on HPM 102 contain a set of sideband signals that relies on circuitry to serialize/deserialize virtual wires that are tunneled over a 1-wire interface, called the Modular-Peripheral Sideband Tunneling Interface (M-PESTI). Peripheral subsystems 116 may include, for example, EDSFF (Enterprise and Datacenter Standard Form Factor) devices, RAID (Redundant Array of Independent Disks) controllers, PCIe (Peripheral Component Interconnect Express) CEM (Card Electro-Mechanical) cards, back planes, and OCP NIC 3.0 adapter cards. Other hardware interfaces and connectors to couple HPM 102 to chassis infrastructure elements and subsystems may follow the Platform Infrastructure Connectivity (M-PIC) specification.

DC-MHS provides a family of specifications to enable interoperability between datacenter and enterprise infrastructure by providing consistent interfaces and form factors among modular building blocks. For example, the Open Compute Project® is developing following HPM specifications. The Modular Hardware System Full Width Specification (M-FLW), which is an HPM form factor specification that is optimized for using the full width of a standard rack-mountable server. The Modular Hardware System Partial Width Density Optimized Specification (M-DNO), which is an HPM specification that is targeted to partial width, such as half-width or three-quarters-width, form factors.

The DC-SCM design simplifies the deployment of HPMs and increases the efficiency for time to market deployment for new systems. The DC-SCM has a standardized pinout and definition, which provides common boot, monitoring, control, and remote debug for diverse platforms.

DC-SCI 103 supports several PCIe bus options between DC-SCM 101 and HPM 102, including PCIe Gen 2.0 up to PCIe Gen 5.0 ×1 interface, SPI interfaces, NC-SI RMII-based transport (RBT) interface, LTPI, eSPI bus, and I2C/I3C bus among others.

DMTF (formerly known as the Distributed Management Task Force) creates open manageability standards including the SPDM standard, which enables authentication, attestation, and key exchange to enable and enhance infrastructure security. SPDM defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Data center administrators require components to establish trust, and to reestablish trust over time, with other components before securely communicating. SPDM provides an authentication mechanism to establish trust between two endpoints. SPDM enables the creation of a session to exchange secured messages between the endpoints. The components may include encompass a number of component types, including PCIe adapters, BMCs, authentication components, CPUs, and components that are attached over I2C, I3C, or other buses. SPDM enables authentication and secure communication by retrieval of a public key certificate from a component and using a protocol to challenge the component to prove that it is the component whose identity is uniquely described by that certificate. SPDM allows retrieval of a signed measurement payload of mutable components from a component. The measurements may represent a firmware revision, component configuration, the Root of Trust for Measurements, hardware integrity, etc. SPDM provides negotiation of session keys with a component, thereby enabling secured message exchanges with that component.

The Platform Management Components Intercommunication (PMCI) working group of the DMTF prepared the Security Protocol and Data Model (SPDM) Specification (DSP0274) version 1.2.1 dated Jun. 23, 2022, defines messages, data objects, and sequences for performing message exchanges between devices over a variety of transport and physical media. The SPDM Specification sets forth a messaging protocol that defines a request-response messaging model between two endpoints to perform the message exchanges outlined in SPDM message exchanges. The content of the Security Protocol and Data Model (SPDM) Specification (DSP0274) version 1.2.1, including the SPDM message exchanges, are hereby incorporated by reference herein in its entirety.

Figure 2:
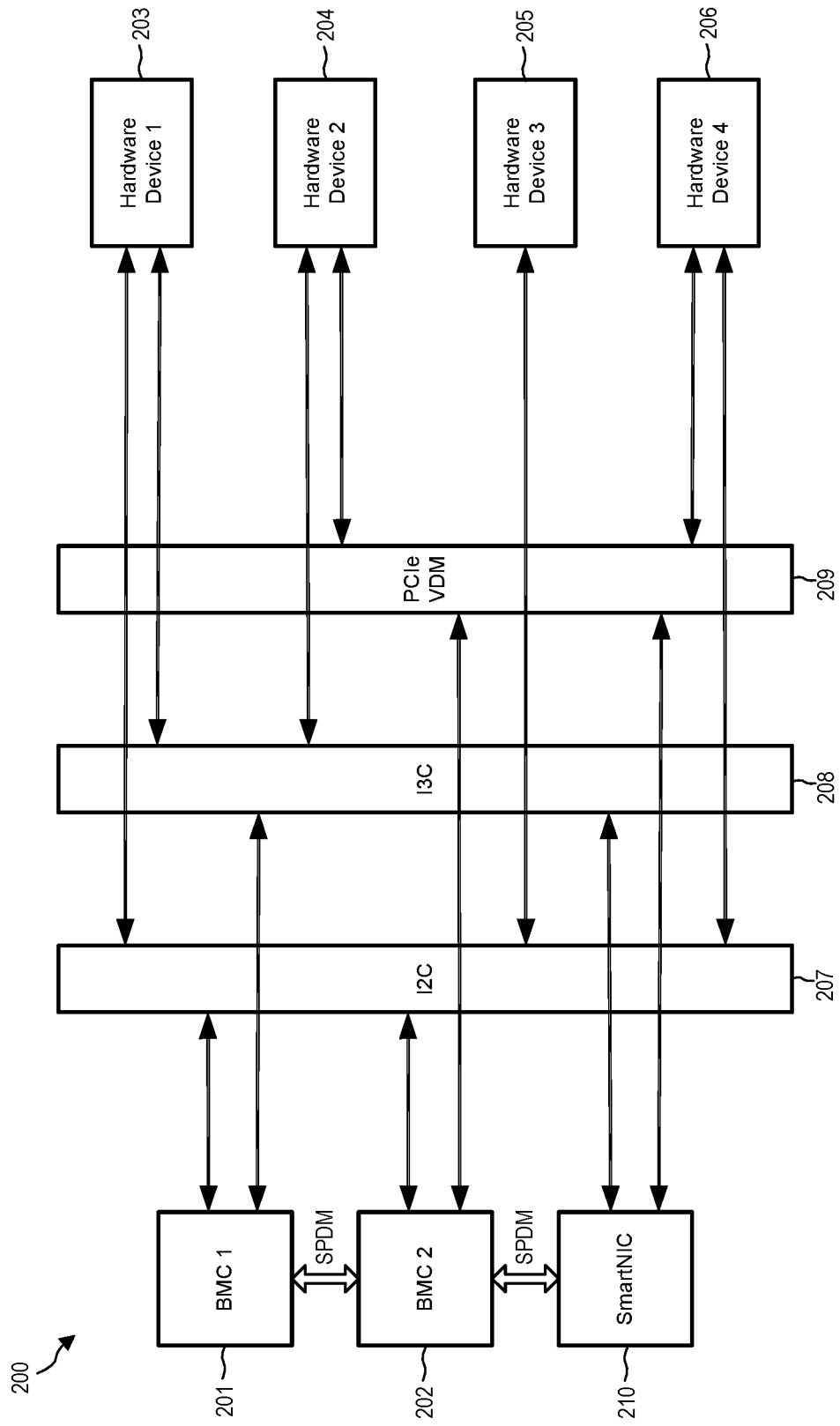
FIG. 2 is a block diagram illustrating elements of a data center system, such as components of a server or an Information Handling System.

FIG. 2 is a block diagram illustrating elements of a data center system 200, which may be components of a server or an IHS, for example. Multiple BMCs 201, 202 are in communication with a number of hardware devices 203, 204, 205, 206 via networks 207, 208, 209. Other devices, such as a SmartNIC 210 may also have management capabilities and may also communicate with hardware devices 203, 204, 205, 206. Networks 207, 208, 209 may comply with different communication standards. For example, network 207 may use an Inter-Integrated Circuit (I2C) transport protocol, network 208 follows an I3C speciation, and network 209 follows a Peripheral Component Interconnect Express Vendor-Defined Message (PCIe-VDM) standard.

In one arrangement, SmartNIC 210 and hardware devices 203, 204, 205, 206 are components of an HPM and include one or more of CPUs, memory, data processing units (DPU), and/or infrastructure processing units (IPU). Hardware devices 203, 204, 205, 206 may also be peripheral devices, such as EDSFF devices, RAID controllers, PCIe CEM cards, back planes, and/or OCP NIC 3.0 adapter cards that are connected to an HPM. Networks 207, 208, 209 may be part of a secure control interface (DC-SCI), for example, and/or may include connectors and interfaces that comply with the M-XIO, M-PESTI, and/or M-PIC specifications. In a modular server architecture, BMCs 201, 202 and hardware devices 203, 204, 205, 206 may be separate components that do not share a common physical location or motherboard.

In system 200, the multiple BMCs 201, 202 operate in an active-active redundant state. Each BMC 201, 202 and SmartNIC 210 may be capable of communicating over various combination of networks 207, 208, 209. As illustrated in FIG. 2, BMC 201 is configured to use I2C and I3C networks 207, 208. BMC 202 is configured to use I2C and PCIe-VDM networks 207, 209. SmartNIC 210 is configured to use I3C and PCIe-VDM networks 208, 209.

Similarly, hardware devices 203, 204, 205, 206 may be configured to use certain networks. Hardware device 203, is configured to use I2C and I3C networks 207, 208. Hardware device 204 is configured to use I3C and PCIe-VDM networks 208, 209. Hardware device 205 is configured to use only I2C network 207. Hardware device 206 is configured to use I2C and PCIe-VDM networks 207, 209.

If workload balancing requires sharing the load among BMCs 201, 202, then hardware connectivity is relevant to which BMC 201, 202 or management-capable SmartNIC 210 should accept loads. The BMCs 201, 202 need to negotiate their capabilities and split or share the workload and management tasks between them to avoid deadlock and improve efficiency. SmartNIC device 210 can perform and offload some of the system management activities on behalf of BMCs 201, 202. So, when a BMC 201, 202 is heavily loaded, then that BMC can offload the tasks to SmartNIC 210 temporally. However, BMCs 201, 202 first need to discover the capabilities and services that can be offloaded, which can be accomplished in one embodiment using SPDM messages.

Hardware devices 203-206 are SPDM-capable devices that support identity authentication use a certificate chain containing an ordered list of certificates. A complete certificate chain has (i) a first certificate either signed by a Root Certificate (a certificate that specifies a trust anchor) or is a Root Certificate itself, (ii) subsequent certificates signed by the preceding certificate, and (iii) a final certificate containing a public key used to authenticate the SPDM device. The final certificate is called the leaf certificate. Certificate chains are stored in logical locations called slots. Slots are numbered zero through seven. Each slot is either empty or contains one complete certificate chain. The certificate chains follow either a DeviceCert model or an AliasCert model. When queried, the certificate model type is identified in the SPDM CAPABILITEIS response message. The certificate chain includes a device certificate that binds an asymmetric public/private key pair to a particular device and associates the device with additional metadata. The device certificate includes hardware identity information.

Figure 3:
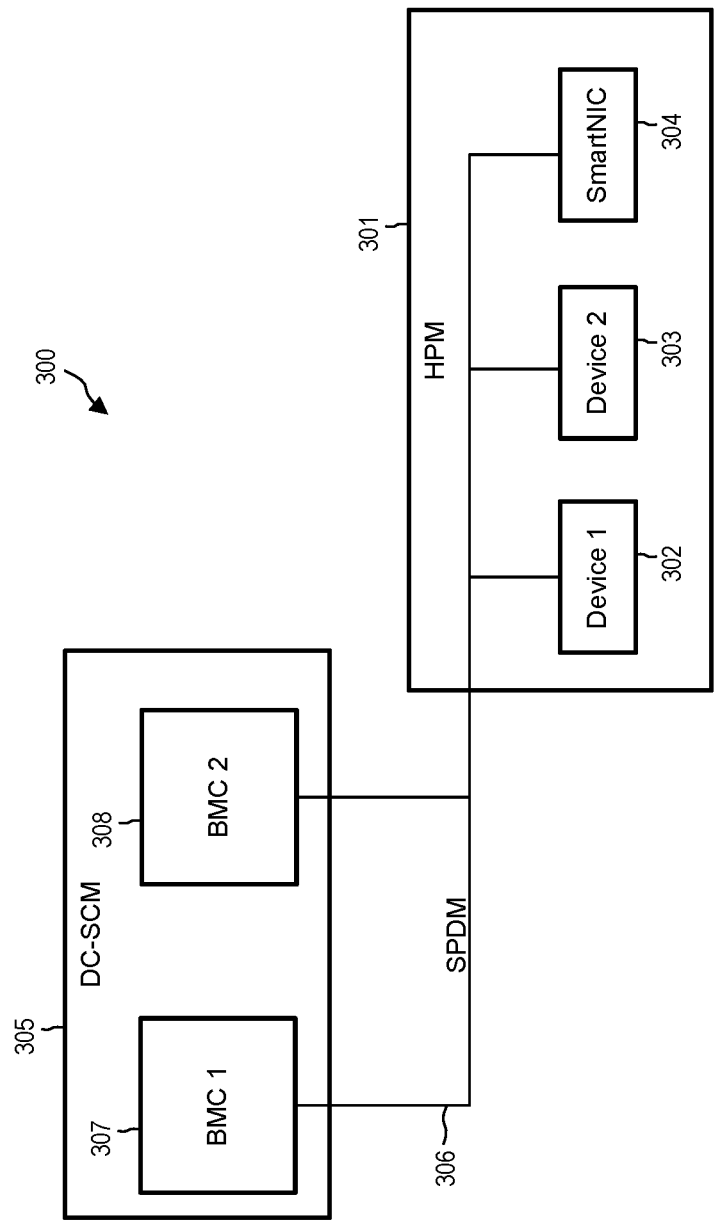
FIG. 3 is a block diagram illustrating elements of a data center system having multiple baseboard management controllers.

FIG. 3 is a block diagram illustrating elements of a data center system 300, which may be components of a server or an IHS, for example. HPM 301 comprises compute elements, such as a CPU or graphics processing unit (GPU), memory, and/or other hardware devices 302, 303, 304, such as a SmartNIC. HPM 301 is in communication with DC-SCM 305 via a connector, bus, or interface 306. DC-SCM 305 includes multiple BMCs 307, 308.

System 300 allows a data center to discover and provision hardware devices 302-304 using SPDM messages. As defined in the SPDM Specification, BMCs 307, 308 may act as Requester endpoints that send SPDM messages to other endpoints, such as devices 302-304, that act as Responders. A certificate chain is supported by SPDM. The certificate chain contains at least one certificate that includes hardware identity information. The hardware identity information should be present in a device certificate and is identified by a hardware identity object identifier.

In the multi-BMC environment 300, each BMC 307, 308 does SPDM discovery and inventory of the hardware devices 302, 303, 304. Then BMCs 307, 308 and smart devices, such as SmartNIC 304, discover each other and negotiate the discovered hardware devices 302, 303, 304 and each device's capabilities. BMCs with higher bandwidth capability, such as I3C over I2C, are connected to higher bandwidth hardware devices 302, 303, 304. Similarly, if a BMC has only lower bandwidth, then that low-bandwidth BMC establishes connectivity to the hardware devices supporting only the lower bandwidth.

In cases where there is no lower bandwidth device, then a BMC having higher bandwidth will connect to hardware devices in whatever lower bandwidth mode is supported by the hardware device. Once a BMC establishes the connection and create a SPDM secure session with device, the BMC shares the credentials and SPDM session details among the other BMCs. In the event of a connection failure between a BMC and an assigned device, then another BMC can take over the connection with the device seamlessly.

Figure 4:
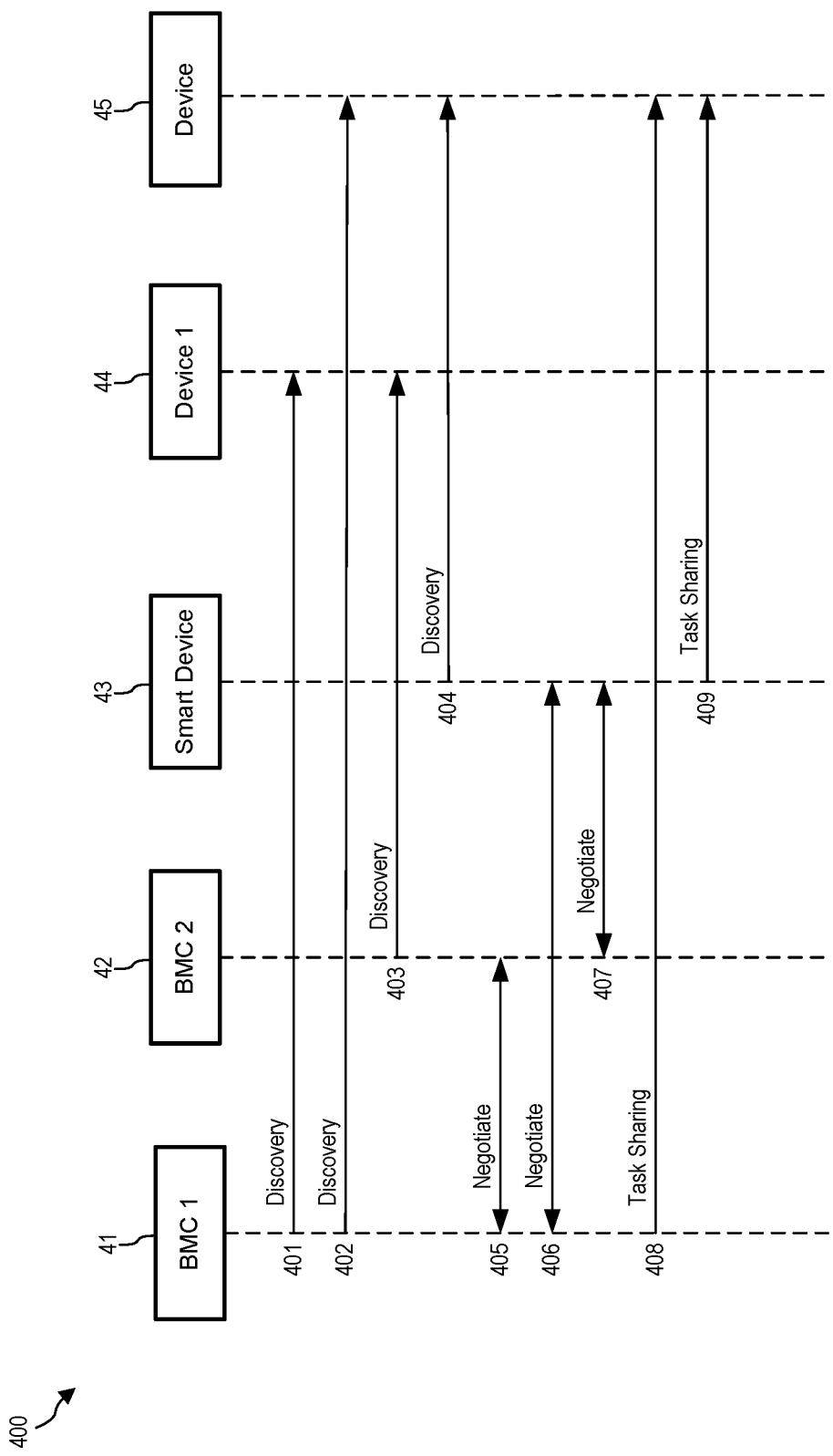
FIG. 4 illustrates a message flow that is exchanged between multiple baseboard management controllers, a smart device, and hardware devices to establish access among the devices.

FIG. 4 illustrates a message flow 400 that is exchanged between BMCs 41, 42, smart device 43, such as a SmartNIC, and hardware devices 44, 45. This messages flow allows BMCs 41, 42 and smart device 43 to discover other hardware devices 44, 45 and to establish which BMC 41, 42 or smart device 43 will manage the hardware devices 44, 45.

In step 401, BMC 41 begins a discovery process using SPDM messages. BMC 41 is configured to operate on certain networks and/or with certain communication standards or protocols. BMC 41 discovers hardware device 44 via SPDM messages. For example, BMC 41 may send SPDM GET_VERSION and GET_CAPABILITIES request messages to hardware device 44, which replies with corresponding VERSION and CAPABILITIES response messages. In this example, hardware device 44 is identified as capable of communicating with BMC 41. BMC 41 may also collect a hardware identity certificate for hardware device 44 using an SPDM GET_CERTIFICATE request message.

In step 402, BMC 41 continues the discovery process and identifies hardware device 45, which may be on a separate network from device 44 or configured to use a different communication standard or protocol than device 44.

In step 403, BMC 42 performs discovery and discovers hardware device 44 via SPDM messages. BMC 41 and BMC 42 are on the same system, such as the same DC-SCM.

In step 404, Smart Device 43, which has some management capability, also performs discovery and discovers hardware device 45 via SPDM messages.

In step 405, BMC 41 negotiates with BMC 42. The BMCs 41, 42 each identify the hardware devices 44, 45 that have been found along with the capabilities of each, such as the communication networks and protocols available to each hardware device 44, 45. BMCs 41 and 42 determine which BMC will be responsible for monitoring and managing the individual hardware devices 44, 45. In step 406, BMC 41 negotiates with Smart Device 43 in the same manner. In step 407, BMC 42 negotiates with Smart Device 43. In steps 405-407, the negotiations determine which BMC 41, 42 and Smart Device 43 are assigned access to hardware devices 44, 45. The devices' bandwidth and topology may be used to determine access, for example.

In one arrangement, the BMC 41, 42 with the higher bandwidth will establish connectivity to the higher bandwidth-capable hardware device 44, 45. Similarly, a BMC 41, 42 that has a lower bandwidth establishes connectivity to the lower bandwidth-capable hardware device 44, 45. Alternatively, a higher bandwidth BMC may connect to a lower bandwidth hardware device using the highest bandwidth mode supported by the hardware device.

In steps 408 and 409, based upon the negotiated access in steps 405-407, BMC 41 and Smart Device 43 begin sharing tasks to hardware device 45.

Once BMCs 41, 42 establish connections and create SPDM secure sessions with the hardware devices 44, 45, the BMCs 41, 42 share credentials and SPDM session details with each other so that if there is a connection failure between a BMC and an assigned hardware device, then the other BMC can seamlessly take over that connection with the hardware device.

In one embodiment, an IHS comprises one or more host processor modules configured to host SPDM-enabled hardware devices, and a secure control module configured to host two or more baseboard management controllers. Each of the baseboard management controllers comprise at least one processor coupled to at least one memory. The at least one memory having program instructions stored thereon that, upon execution by the at least one processor, cause the baseboard management controller to discover the SPDM-enabled hardware devices using SPDM messages, negotiate with at least one other baseboard management controller for access to individual ones of the SPDM-enabled hardware devices, and manage selected ones of the SPDM-enabled hardware devices. The program instructions further cause the baseboard management controller to identify a communication bandwidth associated with each of the SPDM-enabled hardware devices and to determine which of the SPDM-enabled hardware devices can be managed by the baseboard management controller based upon the communication bandwidth associated with the SPDM-enabled hardware devices.

The program instructions further cause the baseboard management controller to identify a communication protocol associated with each of the SPDM-enabled hardware devices and to determine which of the SPDM-enabled hardware devices can be managed by the baseboard management controller based upon the communication protocol associated with the SPDM-enabled hardware devices. The communication protocol includes one or more of an I2C transport protocol, an I3C protocol, and a PCIe-VDM protocol.

The program instructions further cause the baseboard management controller to establish secure communication sessions with the selected ones of the SPDM-enabled hardware devices. The program instructions further cause the baseboard management controller to provide credentials for the secure communication sessions with at least one other baseboard management controller.

The program instructions further cause the baseboard management controller to receive communication credentials from another baseboard management controller, wherein the credentials are associated with secure communication sessions between the other baseboard management controller and additional ones of the SPDM-enabled hardware devices. The program instructions further cause the baseboard management controller to receive notification that the other baseboard management controller is not communicating with the additional ones of the SPDM-enabled hardware devices and to use the communication credentials to establish secure communication sessions with the additional ones of the SPDM-enabled hardware devices.

In another embodiment, an IHS comprises a baseboard management controller in communication with a plurality of SPDM-enabled devices. The baseboard management controller comprising at least one processor coupled to at least one memory. The at least one memory having program instructions stored thereon that, upon execution by the at least one processor, cause the baseboard management controller to discover the SPDM-enabled hardware devices using SPDM messages, negotiate with at least one other baseboard management controller for access to a first group of SPDM-enabled hardware devices, and manage the first group of SPDM-enabled hardware devices. The program instructions further cause the baseboard management controller to identify a communication bandwidth associated with each of the SPDM-enabled hardware devices and determine which of the SPDM-enabled hardware devices can be managed by the baseboard management controller based upon the communication bandwidth associated with the SPDM-enabled hardware devices.

The program instructions further cause the baseboard management controller to identify a communication protocol associated with each of the SPDM-enabled hardware devices and determine which of the SPDM-enabled hardware devices can be managed by the baseboard management controller based upon the communication protocol associated with the SPDM-enabled hardware devices. The communication protocol includes one or more of an I2C transport protocol, an I3C protocol, and a PCIe-VDM protocol.

The program instructions further cause the baseboard management controller to establish secure communication sessions with the first group of SPDM-enabled hardware devices. The program instructions further cause the baseboard management controller to provide credentials for the secure communication sessions with at least one other baseboard management controller.

The program instructions further cause the baseboard management controller to receive communication credentials from another baseboard management controller, wherein the credentials are associated with secure communication sessions between the other baseboard management controller and a second group of SPDM-enabled hardware devices. The program instructions further cause the baseboard management controller to receive notification that the other baseboard management controller is not communicating with the second group of SPDM-enabled hardware devices and to use the communication credentials to establish secure communication sessions with the second group of SPDM-enabled hardware devices.

In a further embodiment, a multiple baseboard management controller load sharing method comprises negotiating, by each of a plurality of baseboard management controllers, with one or more other baseboard management controllers, management of a subset of a group of SPDM-enabled devices based on connectivity of each of the SPDM-enabled devices and managing subsets of devices by assigned baseboard management controllers selected by the negotiating. The connectivity of each of the SPDM-enabled devices may correspond to a communication bandwidth associated with each of the SPDM-enabled devices. The connectivity of each of the SPDM-enabled devices may correspond to a communication protocol associated with each of the SPDM-enabled devices. The method further comprises establishing secure communication sessions with the assigned subsets of SPDM-enabled devices by each of the plurality of baseboard management controllers and providing credentials for the secure communication sessions associated with each of the plurality of baseboard management controllers with at least one other baseboard management controller.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An Information Handling System (IHS), comprising:
   one or more host processor modules configured to host Security Protocol and Data Model (SPDM)-enabled hardware devices; and
   a secure control module configured to host two or more baseboard management controllers;
   wherein each of the baseboard management controllers comprise at least one processor coupled to at least one memory, the at least one memory having program instructions stored thereon that, upon execution by the at least one processor, cause the baseboard management controller to:
   discover the SPDM-enabled hardware devices using SPDM messages;
   negotiate with at least one other baseboard management controller for access to individual ones of the SPDM-enabled hardware devices; and
   manage the individual ones of the SPDM-enabled hardware devices.

2. The IHS of claim 1, wherein the program instructions further cause the baseboard management controller to:
   identify a communication bandwidth associated with each of the SPDM-enabled hardware devices; and
   determine which of the SPDM-enabled hardware devices can be managed by the baseboard management controller based upon the communication bandwidth associated with the SPDM-enabled hardware devices.

3. The IHS of claim 1, wherein the program instructions further cause the baseboard management controller to:
   identify a communication protocol associated with each of the SPDM-enabled hardware devices; and
   determine which of the SPDM-enabled hardware devices can be managed by the baseboard management controller based upon the communication protocol associated with the SPDM-enabled hardware devices.

4. The IHS of claim 3, wherein the communication protocol includes one or more of an Inter-Integrated Circuit (I2C) transport protocol, an I3C protocol, and a Peripheral Component Interconnect Express Vendor-Defined Message (PCIe-VDM) protocol.

5. The IHS of claim 1, wherein the program instructions further cause the baseboard management controller to:
   establish secure communication sessions with the selected ones of the SPDM-enabled hardware devices.

6. The IHS of claim 5, wherein the program instructions further cause the baseboard management controller to:
   provide credentials for the secure communication sessions with at least one other baseboard management controller.

7. The IHS of claim 1, wherein the program instructions further cause the baseboard management controller to:
   receive communication credentials from an additional baseboard management controller, wherein the credentials are associated with secure communication sessions between the additional baseboard management controller and additional ones of the SPDM-enabled hardware devices.

8. The IHS of claim 7, wherein the program instructions further cause the baseboard management controller to:

receive notification that the additional baseboard management controller is not communicating with the additional ones of the SPDM-enabled hardware devices; and use the communication credentials to establish secure communication sessions with the additional ones of the SPDM-enabled hardware devices.

9. An Information Handling System (IHS) comprising:

a baseboard management controller in communication with a plurality of Security Protocol and Data Model (SPDM)-enabled devices, the baseboard management controller comprising at least one processor coupled to at least one memory, the at least one memory having program instructions stored thereon that, upon execution by the at least one processor, cause the baseboard management controller to:

discover the SPDM-enabled hardware devices using SPDM messages;

negotiate with at least one other baseboard management controller for access to a first group of the SPDM-enabled hardware devices; and manage the first group of the SPDM-enabled hardware devices.

10. The IHS of claim 9, wherein the program instructions further cause the baseboard management controller to:

identify a communication bandwidth associated with each of the SPDM-enabled hardware devices; and determine which of the SPDM-enabled hardware devices can be managed by the baseboard management controller based upon the communication bandwidth associated with the SPDM-enabled hardware devices.

11. The IHS of claim 9, wherein the program instructions further cause the baseboard management controller to:

identify a communication protocol associated with each of the SPDM-enabled hardware devices; and determine which of the SPDM-enabled hardware devices can be managed by the baseboard management controller based upon the communication protocol associated with the SPDM-enabled hardware devices.

12. The IHS of claim 11, wherein the communication protocol includes one or more of an Inter-Integrated Circuit (I2C) transport protocol, an I3C protocol, and a Peripheral Component Interconnect Express Vendor-Defined Message (PCIe-VDM) protocol.

13. The IHS of claim 9, wherein the program instructions further cause the baseboard management controller to:

establish secure communication sessions with the first group of SPDM-enabled hardware devices.

14. The IHS of claim 13, wherein the program instructions further cause the baseboard management controller to:

provide credentials for the secure communication sessions with at least one other baseboard management controller.

15. The IHS of claim 9, wherein the program instructions further cause the baseboard management controller to:

receive communication credentials from an additional baseboard management controller, wherein the credentials are associated with secure communication sessions between the additional baseboard management controller and a second group of the SPDM-enabled hardware devices.

16. The IHS of claim 15, wherein the program instructions further cause the baseboard management controller to:

receive notification that the additional baseboard management controller is not communicating with the second group of the SPDM-enabled hardware devices; and use the communication credentials to establish secure communication sessions with the second group of the SPDM-enabled hardware devices.

17. A multiple baseboard management controller load sharing method comprising:

negotiating, by each of a plurality of baseboard management controllers, with one or more other baseboard management controllers, management of a subset of a group of Security Protocol and Data Model (SPDM)-enabled devices based on connectivity of each of the SPDM-enabled devices;

assigning a baseboard management controller to manage the subset of the group of SPDM-enabled devices; and managing the subset of the group of SPDM-enabled devices by the assigned baseboard management controller.

18. The method of claim 17, wherein the connectivity of each of the SPDM-enabled devices corresponds to a communication bandwidth associated with each of the SPDM-enabled devices.

19. The method of claim 17, wherein the connectivity of each of the SPDM-enabled devices corresponds to a communication protocol associated with each of the SPDM-enabled devices.

20. The method of claim 17, further comprising:

establishing secure communication sessions with the subset of the group of SPDM-enabled devices by each of the plurality of baseboard management controllers; and providing credentials for the secure communication sessions associated with each of the plurality of baseboard management controllers with at least one other baseboard management controller.

* * * * *